United States Patent [19]

Okada et al.

[11] Patent Number: 5,003,569
[45] Date of Patent: Mar. 26, 1991

[54] METHOD USING X-RAYS TO DETERMINE THICKNESS OF ORGANIC FILMS

[75] Inventors: Shuji Okada; Hiro Matsuda; Hachiro Nakanishi; Masao Kato, all of Tsukuba, Japan

[73] Assignees: Agency of Industrial Science & Technology; Ministry of International Trade & Industry, both of Tokyo, Japan

[21] Appl. No.: 493,322

[22] Filed: Mar. 14, 1990

[30] Foreign Application Priority Data

Mar. 17, 1989 [JP] Japan .................................. 1-66929

[51] Int. Cl.$^5$ .................. G01N 23/20; H05G 1/08; G01B 15/02
[52] U.S. Cl. .......................................... 378/70; 378/71; 378/89; 378/54; 378/55
[58] Field of Search .................. 378/70, 71, 89, 90, 378/54, 53, 45, 50, 88, 81, 55

[56] References Cited

U.S. PATENT DOCUMENTS

| | | | |
|---|---|---|---|
| 2,428,796 | 10/1947 | Frideman | 378/71 |
| 4,426,719 | 1/1984 | Fraenkel | 378/70 |
| 4,764,945 | 8/1988 | Tadahiro | 378/71 |

Primary Examiner—Edward P. Westin
Assistant Examiner—Don Wong
Attorney, Agent, or Firm—Oblon, Spivak, McClelland, Maier & Neustadt

[57] ABSTRACT

A thickness determination method for organic films comprises the steps of: irradiating an organic film to be measured with x-rays at a certain angle of incidence, finding an angle of reflection at which the x-ray intensity reaches a peak, and finding the thickness of the film from the angle of this peak.

4 Claims, 3 Drawing Sheets

METHOD USING X-RAYS TO DETERMINE THICKNESS OF ORGANIC FILMS

BACKGROUND OF THE INVENTION

1. Field of the Invention

This invention relates to a method of determining the thickness of organic films using x-rays.

2. Prior Art Statement

In recent years, when making various electronic materials, optical materials, magnetic materials and the like into devices, the form of the thin film is widely used because they can be subjected to fine processing, are readily laminated to give them complex functions and other reasons.

Methods used to fabricate such thin films include vacuum deposition, molecular-beam epitaxy, sputtering, chemical vapor deposition, the Langmuir-Blodgett method and others, but regardless of the method used, control of the film thickness at the molecular and atomic level is required to fabricate high-performance devices. To this end, the development of accurate techniques for determining the thickness of the film during fabrication and after fabrication is vital.

Methods of film thickness determination which are known in the prior art include the use of a quartz oscillator for measuring the thickness of films during fabrication and the use of a stylus instrument or ellipsometry to measure the films after fabrication.

A thin film may be deposited on a quartz oscillator, whereby the thickness of the film may be calculated from changes in the frequency of the oscillator caused by the increase in weight due to the deposited film. However, this method is limited to thin films deposited on oscillators and moreover, the value obtained is an average over the entire upper surface of the oscillator so accurate measurement of local film thicknesses is impossible with this method.

A stylus instrument may be used to measure the thickness of a film from the deflection of the stylus tip when put into contact with a sample of the film. However, the high stylus pressure can easily damage the sample, so this method is not suited to soft materials.

Ellipsometry is a viable non-contact method of film thickness determination, but the film thickness cannot be accurately evaluated without knowing the absorbance and index of refraction of the sample with respect to the light used.

The various problems with conventional methods of determining film thickness, as described above, have created great demand for the development of methods of easily determining the thickness of organic films.

The present invention came about in light of the above, and its object is to provide a method of determining the thickness of organic films using x-rays which is able to measure film thickness with a precision on the Å order even during the fabrication of the film, without making contact with the film sample.

SUMMARY OF THE INVENTION

In order to achieve the above object, the film thickness determination method according to the invention comprises the steps of: irradiating an organic film to be measured with x-rays at an angle of incidence of $\theta$, finding the angle of reflection $\theta$ at which the x-ray intensity reaches a peak, and finding the film thickness from this peak.

As described above, through the use of x-rays, the film thickness may be determined without making contact with the film material and without requiring the use of any physical constants of the film material other than the wavelength of the x-rays which is normally already known.

In addition, because this invention is a non-contact method, the thickness of films being fabricated can also be determined by introducing x-rays from outside the film fabrication device and analyzing the diffracted x-rays.

The above and other features and objects of the invention will become apparent with the following detailed description made with reference to the appended drawings.

DETAILED DESCRIPTION OF THE PREFERRED EMBODIMENTS

Figure 1:
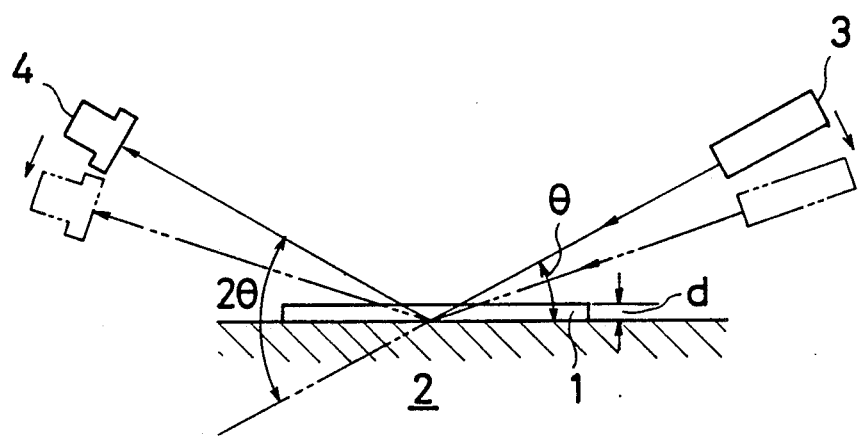
FIG. 1 is an explanatory diagram illustrating the basic principle of the film thickness determination method of the invention.

FIG. 1 illustrates the basic principle of the film thickness determination method of the invention. An organic film 1, the thickness d of which is to be measured, is formed upon a substrate 2. This film 1 is irradiated by x-rays from an x-ray generator 3. The angle between the direction of incidence of the x-rays and the plane of the film 1 is $\theta$, and an x-ray detector (counter tube) 4 is disposed at an angle of $2\theta$ from the direction of x-ray incidence. As a device in which the generator 3 and detector 4 are positioned in such a relationship, a device which has a goniometer mechanism and measures reflected x-ray diffraction may be used.

While the film 1 is irradiated by x-rays from the generator 3, the irradiation angle $\theta$ is continuously varied and the detector 4 is moved accordingly so that x-rays reflected from the film 1 are received at the proper angle of reflection. While x-rays are continuously received, the relationship between the angle $2\theta$ of the detector 4 and the detected intensity of x-rays is recorded.

Figure 2:
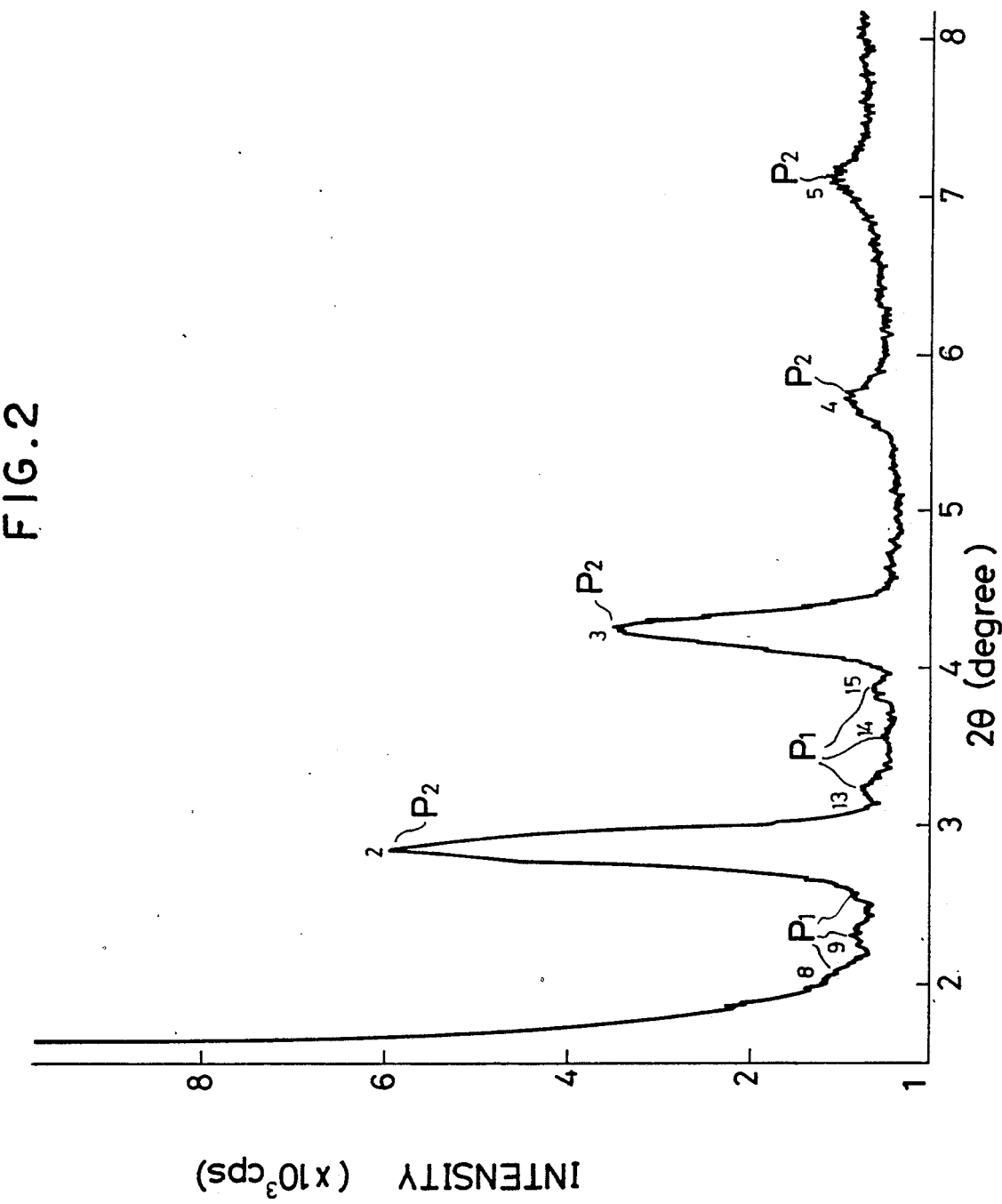
FIG. 2 is an x-ray diffraction pattern showing peaks which appear when the angle of incidence of x-rays is varied.

One example of the relationship between the detection angle $2\theta$ and the x-ray intensity received is as shown in the graph of FIG. 2. Since several peaks $P_1$ are evident, the values of $2\theta$ for this series of peaks is read. However, with crystalline films, other peaks $P_2$ due to the contribution of lattice spacing are also observed, but these peaks are eliminated from the reading.

The thickness d of the film is calculated from the values of $2\theta$ of the group of peaks $P_1$ thus obtained by means of equation (1):

$$d = n\lambda/2\sin\theta \quad (1)$$

which is derived from Bragg's law:

$$2d \cdot \sin\theta = n\lambda$$

where d is the film thickness, $\lambda$ is the x-ray wavelength and n is an arbitrary integer. The number substituted into (1) as the integer n should be selected so that the value of d does not change greatly throughout the series of peaks when n is changed by one from the low-angle side peaks. With a crystalline film, this series of peaks $P_1$ overlaps with other peaks $P_2$ due to the contribution of the lattice spacing, so the integer n should be varied taking this into consideration. Thus the film thickness may be found by taking an average of the values of d found from each peak or by taking a statistically-weighted average of the values.

Organic films which are suitable for the measurement method of the invention may be any formed by vacuum deposition, molecular-beam epitaxy, sputtering, chemical vapor deposition, the Langmuir-Blodgett method and others, and may be of arbitrary thickness as long as they are transparent to x-rays. The film to be measured may also comprise a plurality of layers.

The angle $\theta$ may be in the range from 0.5° to 5° (2$\theta$ of 1° to 10°), above which the peaks become too small, making their reading difficult.

As described above, one starts by irradiating the film with x-rays at an angle within the specified range, then the angle of irradiation is changed by 2-3 degrees until peaks appear in succession, then only the peaks related to the film thickness are read and substituted into equation (1); the average of the values obtained gives the thickness of an organic film to a precision on the Å order.

With the method of determining the thickness of organic films using x-rays of the invention, as illustrated by the preferred embodiments, due to the use of x-rays, the film thickness may be determined with a precision on the Å order without making contact with the film material and without requiring the use of any physical constants of the film material other than the wavelength of the x-rays which is normally already known. Furthermore, it is a non-contact method, so it is a convenient method for determining the thickness of films produced under various conditions.

The invention will now be described in detail based on the following examples but the invention is in no way limited by these examples.

EXAMPLE 1

A chloroform solution of poly(isobutyl methacrylate) was allowed to spread over the surface of demineralized water; the solvent was then evaporated and the surface pressure is raised to 10 mN/m, thus forming a film of poly(isobutyl methacrylate) on the surface of water. The Langmuir-Blodgett method was used to laminate twenty layers of this film onto a glass substrate, the surface of which had been treated to be hydrophobic.

Figure 3:
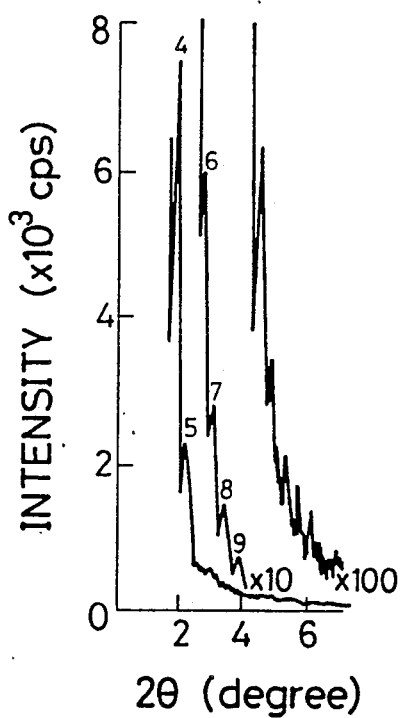
FIG. 3 is an x-ray diffraction pattern for 20 layers of film showing peaks which appear when the angle of incidence of x-rays is varied.

These layers of film attached to the glass substrate were then placed in a film thickness measurement device, together with the glass substrate. Using CuK$_\alpha$ radiation (wavelength $\lambda = 1.542$ Å) as the x-rays, the irradiation angle $\theta$ of x-rays from the x-ray generator was continuously varied from 5° to 0.75°, and a record of the relationship between the detector angle 2$\theta$ and the detected x-ray intensity was made. The results are shown in the graph of FIG. 3. Peaks were seen at detector angles (2$\theta$) of 1.81°, 2.26°, 2.27°, 3.17° and 3.62°. Using integers n of 4, 5, 6, 7 and 8 for the various peaks, equation (1) was used to calculate the film thickness d, giving values of 195 Å, 195 Å, 195 Å, 196 Å and 195 Å, respectively. The average of these values gives a film thickness of 195 Å. This value agreed well with a value of 200 Å calculated as the thickness of 20 layers of film each measured to be 10 Å thick by means of ellipsometry.

EXAMPLE 2

As in Example 1, thirty layers of poly(isobutyl methacrylate) film were laminated to a silicon substrate, the surface of which had been treated to be hydrophobic.

Figure 4:
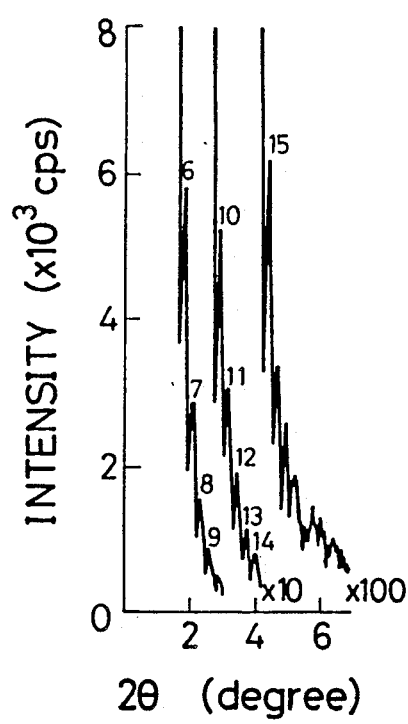
FIG. 4 is an x-ray diffraction pattern for 30 layers of film showing peaks which appear when the angle of incidence of x-rays is varied.

These layers of film attached to the silicon substrate were then placed in a film thickness measurement device, together with the substrate, as illustrated in FIG. 1. Using CuK$_\alpha$ radiation (wavelength $\lambda = 1.542$ Å) as the x-rays, the irradiation angle $\theta$ of x-rays from the x-ray generator was continuously varied from 5° to 0.75°, and a record of the relationship between the detector angle 2$\theta$ and the detected x-ray intensity was made. The results are shown in the graph of FIG. 4. Peaks were seen at detector angles (2$\theta$) of 1.72°, 2.00°, 2.28°, 2.57°, 2.85°, 3.15°, 3.42°, 3.72°, 4.00 ° and 4.30°. Using integers n of 6, 7, 8, 9, 10, 11, 12, 13, 14, and 15, equation (1) was used to calculate the film thickness d for the various peaks, giving values of 308 Å, 309 Å, 310 Å, 309 Å, 310 Å, 309 Å, 310 Å, 309 Å, 309 Å and 308 Å, respectively. The average of these values gives a film thickness of 309 Å. This value agreed well with a value of 300 Å calculated as the thickness of 30 layers of film each measured to be 10 Å thick by means of ellipsometry.

EXAMPLE 3

A chloroform solution of heptacosa-10,12-diynoic acid was allowed to spread over the surface of a water solution of $4 \times 10^{-4}$ M cadmium chloride and $5 \times 10^{-5}$ M potassium bicarbonate; the solvent was then evaporated and the surface pressure is raised to 10 mN/m, thus forming a film of cadmium heptacosa-10,12-diynoate on the surface of the water. The Langmuir-Blodgett method was used to laminate 11 layers of this film onto a glass substrate, the surface of which had been treated to be hydrophilic.

These layers of film attached to the glass substrate were then placed in a film thickness measurement $\theta$ device, together with the substrate. Using CuK$_\alpha$ radiation (wavelength $\lambda = 1.542$ Å) as the x-rays, the irradiation angle $\theta$ of x-rays from the x-ray generator was continuously varied from 5° to 0.75°, and a record of the relationship between the detector angle 2$\theta$ and the detected x-ray intensity was made. The results are shown in the graph of FIG. 2. Large peaks in the diffraction intensity were seen at detector angles (2$\theta$) of 2.91°, 4.33°, 5.83 ° and 7.32° ($P_2$). Small peaks in the diffraction intensity were also seen at detector angles (2$\theta$) of 2.08°, 2.34°, 3.37°, 3.66° and 3.93° (P ). Using integers n of 2, 3, 4 and 5, equation (1) was used to calculate the film thickness d for the peaks of large diffraction intensity, giving values of 61 Å, 61 Å, 61 Å and 60 Å, respectively. This value corresponds spacing at which one unit of the structure of the film repeats, namely, in this case, the thickness of two layers of cadmium heptacosa-10,12-diynoate. On the other hand, using integers n of 8, 9, 13, 14 and 15, equation (1) was used to calculate the film thickness d for the series of peaks of small diffraction intensity, giving values of 340 Å, 340 Å, 341 Å, 338 Å and 337 Å, respectively. The reason why the numbers 10 through 12 are omitted from the values of n was that the diffraction intensities corresponding to these values of n overlap with a peak of large diffraction intensity (the peak at a $2\theta$ of 2.91). The average of these values for thickness d gives a film thickness of 339 Å. This value agrees well with a value of 336 Å calculated as the thickness of 11 layers of film where the thickness of two layers of cadmium heptacosa-10,12-diynoate is found to be 61 Å from the series of peaks of large diffraction intensity.

EXAMPLE 4

Cadmium stearate was heated in a quartz crucible to 120° C. and vacuum-deposited onto a glass substrate at a substrate temperature of 25° C. and a pressure of $1\times 10^{-6}$ torr.

This film attached to the glass substrate was then placed in a film thickness measurement device, together with the substrate. Using $CuK_\alpha$ radiation (wavelength $\lambda = 1.542$ Å) as the x-rays, the irradiation angle $\theta$ of x-rays from the x-ray generator was continuously varied from 5° to 0.75°, and a record of the relationship between the detector angle $2\theta$ and the detected x-ray intensity was made. Large peaks in the diffraction intensity were seen at detector angles ($2\theta$) of 1.85°, 3.80°, 5.64°, 7.48° and 9.42°. Small peaks in the diffraction intensity were also seen at detector angles ($2\theta$) of 2.29°, 2.60°, 2.98°, 4.50 , 4.92° and 5.31°. Using integers n of 1, 2, 3, 4 and 5, equation (1) was used to calculate the film thickness d for the peaks of large diffraction intensity, giving values of 48 Å, 47 Å, 47 Å, 47 Å and 47 Å, respectively. This value corresponds spacing at which one unit of the structure of the film repeats, namely, in this case, the thickness of two layers of cadmium stearate. On the other hand, using integers n of 7, 8, 9, 12, 13, and 14, equation (1) was used to calculate the film thickness d for the series of peaks of small diffraction intensity, giving values of 232 Å, 238 Å, 237 Å, 236 Å, 233 Å and 233 Å, respectively. The reason why the numbers 10 and 11 are omitted from the values of n was that the diffraction intensities corresponding to these values of n overlap with a peak of large diffraction intensity (the peak at a $2\theta$ of 3.80). The average of these values for thickness d gives a film thickness of 235 Å. This value agrees well with a value of 240 Å found during vacuum deposition with a film thickness meter based on a quartz oscillator.

What is claimed is:

1. In a method of determining a thickness of organic films, the following steps comprising:
   irradiating an organic film to be measured with x-rays while continuously varying the angle of incidence of the x-rays with respect to the organic film;
   continuously receiving x-rays reflected by the organic film;
   detecting angles $\theta$ of reflection at which intensities of the reflected x-rays reach respective peaks; and
   determining the thickness of the organic film by taking an average of values of thickness d of the organic film found at each of said peak from said angles $\theta$ of reflection using the formula $d = n\lambda/\sin\theta$, wherein $\lambda$ designates the wavelength of the x-rays and n is an integer.

2. A method according to claim 1, further comprising:
   eliminating intensity peaks due to contributions of lattice spacing; and
   substituting plural successive values of n into said formula, said successive values of n corresponding to the respective peaks of the intensities of the reflected x-rays.

3. A thickness determination method for organic films, comprising the steps of:
   irradiating an organic film to be measured with x-rays while continuously varying the angle of incidence of the x-rays with respect to the organic film;
   continuously receiving x-rays reflected by the organic film;
   detecting angles $\theta$ of reflection at which intensities of the reflected x-rays reach respective peaks;
   determining the thickness of the organic film by taking an average of values of thickness d of the organic film found at each of said peak from said angles $\theta$ of reflection using the formula $d = n\lambda/2\sin\theta$, wherein $\lambda$ designates the wavelength of the x-rays and n is an integer; and
   substituting plural successive values of n into said formula, said successive values of n corresponding to the respective peaks of the intensities of the reflected x-rays.

4. The thickness determination method of claim 1 in which the angle of incidence of x-rays with respect to the film is in the range of 0.5° to 5°.

* * * * *